(12) United States Patent
Nozaki

(10) Patent No.: US 6,792,718 B2
(45) Date of Patent: Sep. 21, 2004

(54) VEHICLE SEAL

(75) Inventor: Masahiro Nozaki, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 25 days.

(21) Appl. No.: 10/162,659

(22) Filed: Jun. 6, 2002

(65) Prior Publication Data

US 2002/0184826 A1 Dec. 12, 2002

(30) Foreign Application Priority Data

Jun. 7, 2001 (JP) ........................................ 2001-172758
Mar. 29, 2002 (JP) ........................................ 2002-097062

(51) Int. Cl.[7] .............................................. E05D 15/16
(52) U.S. Cl. ........................................ 49/441; 49/480.1
(58) Field of Search ................. 49/440, 441, 480.1, 49/475.1, 495.1, 490.1

(56) References Cited

U.S. PATENT DOCUMENTS

| | | | |
|---|---|---|---|
| 5,226,258 A | * | 7/1993 | Mesnel et al. ............. 49/490.1 |
| 5,414,961 A | * | 5/1995 | Tessier ........................ 49/441 |
| 6,108,978 A | * | 8/2000 | Jeong ........................... 49/440 |
| 2001/0001916 A1 | | 5/2001 | Nozaki |

FOREIGN PATENT DOCUMENTS

| | | | | |
|---|---|---|---|---|
| DE | 3619599 A1 | * | 12/1987 | ............. E06B/7/23 |
| EP | 178064 A2 | * | 4/1986 | ............. F16J/15/02 |
| FR | 2689457 | | 10/1993 | |
| FR | 2738534 | | 3/1997 | |
| JP | 1-145752 | | 10/1989 | |
| JP | 2001-219745 | | 8/2001 | |

* cited by examiner

Primary Examiner—Jerry Redman
(74) Attorney, Agent, or Firm—Posz & Bethards, PLC

(57) ABSTRACT

A vehicle seal that prevents the sealing capability with respect to a window glass from decreasing. The vehicle seal is attached to a frame defining a window glass opening of a vehicle to support a peripheral portion of a vertically movable window glass. The vehicle seal includes a main body arranged along the frame of the opening. Seal lips are formed integrally with the main body to contact the surface of the window glass. The seal lips include, on at least one side of the glass, an intermediate seal lip and a cover seal lip that is located closer to a center of the opening than the intermediate seal lip. An elastically deformable connecting portion connects the main body and the intermediate seal lip.

13 Claims, 6 Drawing Sheets

VEHICLE SEAL

CROSS-REFERENCE TO RELATED APPLICATIONS

This application is related to and claims priority from Japanese Patent Application Nos. 2001-172758 and 2002-97062, the contents of which are incorporated herein by reference.

BACKGROUND OF THE INVENTION

1. Field of the Invention

The present invention relates to a seal that is attached to a door of a vehicle.

2. Description of Related Arts

A glass run is provided on a window frame, which defines a window glass opening, to guide the vertical movement of a window glass and to seal between the window frame and the window glass. Further, seals, such as an outer glass weather strip and an inner glass weather strip, are attached to the belt line of a door to contact and seal the outer side and inner side of the window glass. Such seals including the glass run contribute to shutting out water, dust, and noise.

The glass run includes a base, or a run main body, which is fixed to the upper, front, and rear sides of the window frame and has a U-shaped cross-section. The glass run also includes a pair of seal lips, which contact and seal the inner and outer sides of the peripheral portion of the window glass.

The outer glass weather strip and the inner glass weather strip are arranged along the belt line, which is located at the vertically middle portion of the door. The two weather strips each include a base, or a main body, which is attached to a door panel by, for example, clips, and a seal lip, which contacts and seals the outer or inner surface of the window glass. An insert, which is formed from a metal plate and functions to maintain the shape of the base or the main body, is embedded in the base or the main body. Each end of the two glass weather strips is connected to the front or rear portion of the glass run. The glass window is normally flat or curved in the vertical and horizontal directions to define a somewhat convex surface.

Due to the trend in appearance and design of a vehicle, vehicles having bodies with curved outlines are being manufactured. To improve the aesthetic appearance, vehicles provided with three-dimensional window glasses that are being developed are significantly curved in the vertical and horizontal directions in accordance with the curved body outlines.

The shortcomings of a vertically movable three-dimensional window glass will now be discussed.

Since the window glass is significantly curved in a three-dimensional manner, the displaced amount of the window frame in a horizontal direction varies accordingly at different locations. The displaced amount of the window frame may be greater than that of a window frame for a conventional window glass. As the displaced amount of the window frame increases, the distance between the outer surface of the window glass and the opposing inner surface of an outer side wall of the window frame and the distance between the inner surface of the window glass and the opposing outer surface of an inner side wall of the window frame become significantly large.

Therefore, if the seal lips used in the glass run and the weather strips for the three-dimensional window glass have the same flexing amount as the seal lips used in the glass run and the weather strips for the conventional window glass, the pressure applied by the seal lips to the inner and outer surfaces of the window glass may be insufficient. When the pressure applied by the seal lips is insufficient, the sealing capability of the seal lips for sealing the interior of the vehicle from the exterior of the vehicle may decrease. Further, smooth vertical movement of the window glass may be hindered.

Accordingly, a seal lip having a flexing amount that is in accordance with the distance between the window glass and the window frame may be employed. However, this would increase the projected amount of the lip from the base of the glass run or the weather strip. As a result, the rigidity of the seal lip would decrease. When the rigidity of the seal lip decreases in this manner, it becomes difficult for the seal lip to produce the preferred sealing pressure and seal the interior of the vehicle from the exterior of the vehicle in the desirable manner.

A vehicle seal is also arranged along a frame of a conventional window glass in addition to a frame of a vertically movable three-dimensional window glass. In such case, the above problem would also occur when the curve of the window frame or the belt line of the door differs from the curve of the window glass.

SUMMARY OF THE INVENTION

It is an object of the present invention to provide a vehicle seal that prevents the sealing capability of a seal lip with respect to a window glass from decreasing.

To achieve the above object, the present invention provides a vehicle seal attached to a frame defining a window glass opening of a vehicle to support a peripheral portion of a vertically movable window glass. The vehicle seal includes a main body arranged along the frame of the opening. A plurality of seal lips are formed integrally with the main body to contact a surface of the window glass. The plurality of seal lips include an intermediate seal lip and a cover seal lip. The intermediate seal lip and the cover seal lip contact the same surface of the window glass. The cover seal lip is located closer to a center of the opening than the intermediate seal lip. An elastically deformable connecting portion connects the main body and the intermediate seal lip.

A further perspective of the present invention is a glass run attached to a window frame defining an opening in a vehicle to support a peripheral portion of a vertically movable window glass. The glass run includes a vertical portion attached to a vertical side of the window frame and an upper portion attached to an upper side of the window frame. The vertical portion includes a first main body having a U-shaped cross-section and arranged along the window frame. The first main body has a first inner side wall, which is located on an interior side of the vehicle, and a first outer side wall, which is located on an exterior side of the vehicle. A first inner seal lip is formed on the first inner side wall to contact an inner surface of the window glass. A first outer seal lip is formed on the first outer side wall to contact an outer surface of the window glass. An intermediate seal lip is located farther from a center of the opening than the first inner seal lip. The intermediate seal lip contacts the inner surface of the window glass. A connecting portion elastically deforms the first main body and the intermediate seal lip. The upper portion includes a second main body having a U-shaped cross-section and arranged along the window frame. The second main body has a second inner side wall, which is located on the interior side of the vehicle, and a second outer side wall, which is located on the exterior side of the vehicle. A second inner seal lip is formed on the second inner side wall to contact the inner surface of the window glass. A second outer seal lip is formed on the second outer side wall to contact the outer surface of the window glass.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
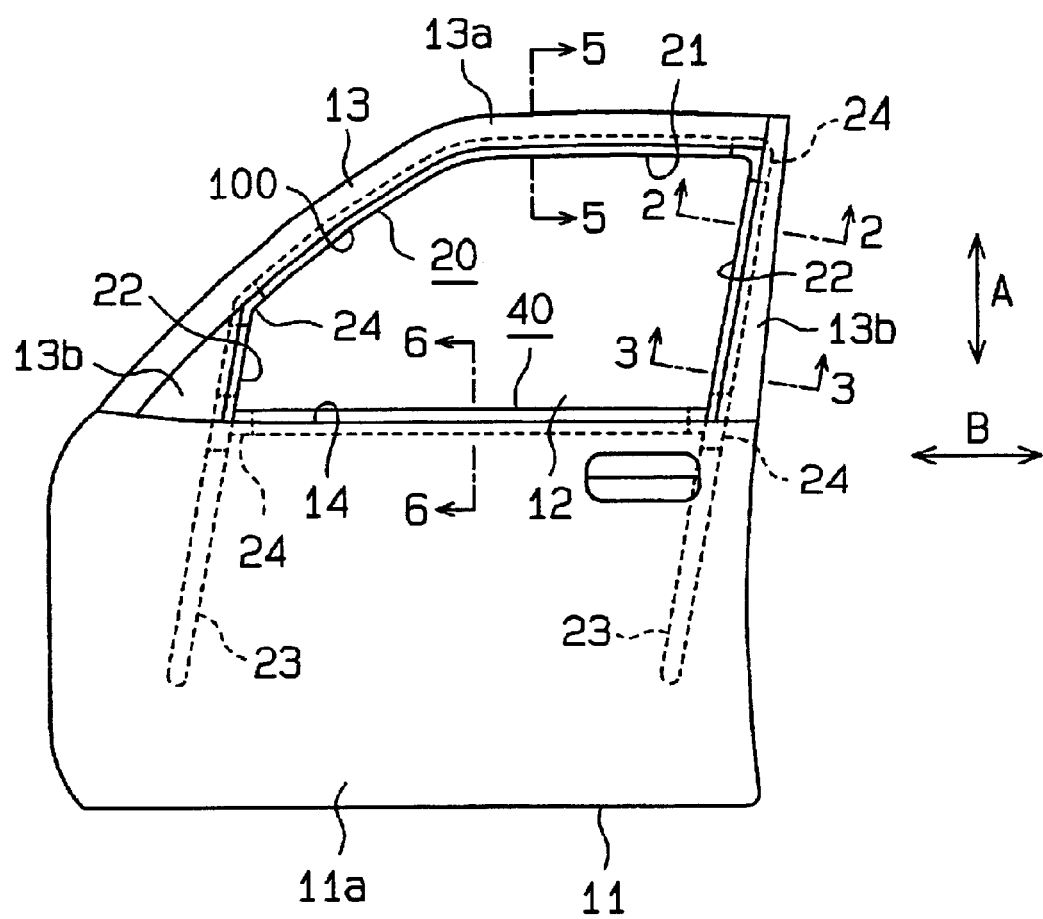
FIG. 1 is a side view of a front door to which a glass run is attached in accordance with a first embodiment of the present invention.

In the drawings, like numerals are used for like elements throughout.

A glass run (vehicle seal), according to a first embodiment of the present invention will now be discussed with reference to FIGS. 1 to 9.

As shown in FIG. 1, a front door 11, has a window frame 13, which is formed in accordance with the shape of a window glass 12. A window glass opening 100 is defined by the window frame 13 above a belt line 14 of the front door 11. The window glass 12 is significantly curved in a three-dimensional manner in the vertical direction (the direction indicated by arrow A in FIG. 1) and the horizontal direction (the direction indicated by arrow B in FIG. 1). The window glass 12 is arranged so that it is movable in the window frame 13 along the direction indicated by arrow A.

A glass run 20 is arranged along the peripherally inner side of the window frame 13. The glass run 20 is made of rubber such as ethylene propylene diene terpolymer (EPDM), thermoplastic elastomer such as thermoplastic olefin (TPO), elastomeric synthetic resin such as elastomeric polyvinyl chloride, or a mixture of these substances. The glass run 20 includes a first extruded portion (upper portion) 21, which is attached to an upper portion 13a of the window frame 13, and second extruded portions (vertical portion) 22, which are attached to vertical portions 13b of the window frame 13. Further, the glass run 20 includes third extruded portions (vertical portion) 23, which are accommodated in the door 11, and molded portions 24, which connect the adjacent extruded portions 21–23. The extruded portions 21–23 are each formed through a known extrusion process and cut into a predetermined length. The molded portions 24 are each formed through a known injection molding process, for example, to correspond with the corners of the window frame 13. The extruded portions 21–23 are connected to one another when the molded portions 24 are molded. Thus, the extruded portions 21–23 and the molded portions 24 are formed integrally.

Figure 5:
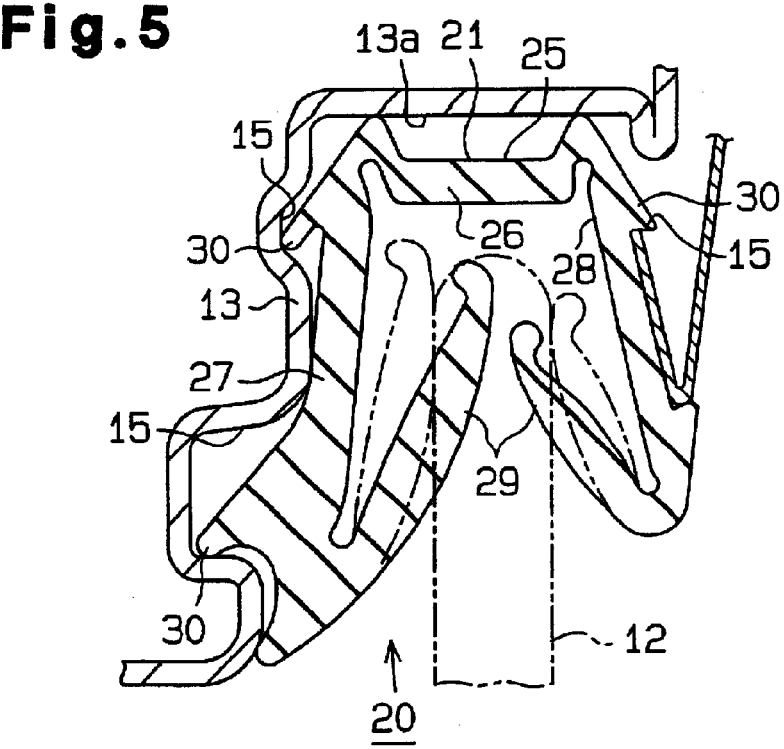
FIG. 5 is a cross-sectional view taken along line 5—5 of FIG. 1.

Referring to FIG. 5, the first extruded portion (upper portion) 21, which defines the upper portion of the glass run 20, has an U-shaped main body (second main body) 25. The main body 25 includes a bridging wall 26 and a pair of side walls (second inner side wall 27 and second outer side wall 28) extending vertically downward from the edges of the bridging wall 26. The inner side wall 27 extends longer than outer side wall 28.

A seal lip 29 extends from each of the side walls 27, 28. The seal lips 29 are formed as if the distal portions of the side walls 27, 28 are bent. The seal lips (second inner seal lip and second outer seal lip) 29 elastically contact and guide the peripheral inner and outer surfaces of the upper side of the window glass 12 when the glass 12 is moved to open or close the window glass opening 100. The seal lips 29 function to seal the interior of the vehicle from the exterior of the vehicle when the window glass 12 closes the window glass opening 100.

The side walls 27, 28 have holding lips 30, which extend outward. The holding lips 30 are engaged with holders 15, which are formed in the upper portions 13a of the window frame 13. This supports the main body 25 of the glass run 20 in the window frame 13.

Figure 2:
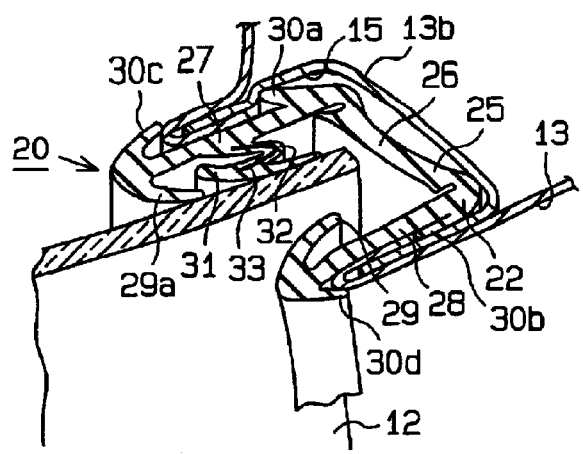
FIG. 2 is a perspective cross-sectional view taken along line 2—2 in FIG. 1.

Referring to FIG. 2, the second and third extruded portions 22, 23 each have an U-shaped main body (first main body) 25. The main body 25 includes a bridging wall 26 and a pair of side walls (first inner side wall 27 and first outer side wall 28) extending in the longitudinal direction of the window glass 12 at a substantially right angle from the edges of the bridging wall 26. Seal lips 29a, 29 extend respectively from the inner and outer side walls 27, 28. An intermediate seal lip 31 is formed between the seal lip 29a and the bridging wall 26 on the inner side wall 27. The seal lip (first inner seal lip) 29a, which is located in the interior side of the vehicle, serves as a cover seal lip. The intermediate seal lip 31 is formed on the distal end of a V-shaped connecting portion 32, which extends toward the outer side wall 28 from the inner side wall 27. The connecting portion 32 is elastically deformable so that the intermediate seal lip 31 moves relatively toward and away from the inner side wall 27. The large flexing amount of the connecting portion 32 enables the intermediate seal lip 31 to contact the window glass 12 while applying an adequate pressure to the window glass 12 with a flexing amount that is greater than that of the cover seal lip 29a.

Figure 3:
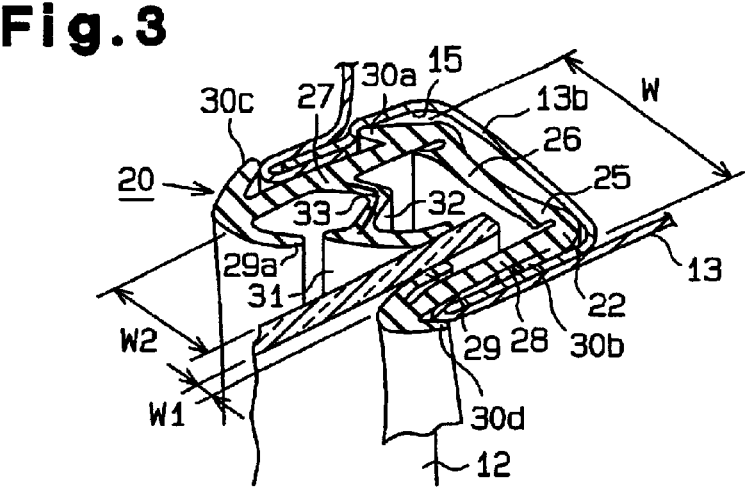
FIG. 3 is a perspective cross-sectional view taken along line 3—3 in FIG. 1.

The connecting portion 32 is covered by the cover seal lip 29a. Thus, the connecting portion 32 cannot be seen from the interior of the vehicle even when a gap is formed between the cover seal lip 29a and the intermediate seal lip 31, as shown in FIG. 3. The cover seal lip 29a and the intermediate seal lip form a double-step structure on the inner side wall 27. The seal lip (first outer seal lip) 29, the cover seal lip 29a, and the intermediate seal lip 31 elastically contact the inner and outer surfaces of the window glass 12. Further, the seal lip 29, the cover seal lip 29a, and the intermediate seal lip 31 contact the window glass 12 to guide the vertical movement of the window glass 12 and function to seal the interior of the vehicle from the exterior of the vehicle when the window glass 12 closes the window glass opening 100.

Holding lips 30a, 30b, which extend outward, are formed on the bridging wall 26. The holding lip 30a is engaged with the holder 15, which is formed in the vertical portion 13b of the window frame 13. Further, holding lips 30c, 30d extend outward from the distal ends of the side walls 27, 28, respectively. The holding lips 30a, 30b, 30c, 30d hold the main body 25 in the window frame 13.

The window glass 12 has a three-dimensional shape. To enable the vertical movement of the window glass 12, the window frame 13 is formed so that the width W (refer to FIG. 3) of the window frame 13 is greater than that of the related art window frame. Further, referring to FIGS. 2 and 3, the distance W1 between the outer surface of the window glass 12 and the opposing inner surface of the outer side wall 28 of the window frame 13 varies greatly between different locations of the window frame 13. In the same manner, the distance W2 between the inner surface of the window glass 12 and the opposing outer surface of the inner side wall 27 of the window frame 13 varies greatly between different locations of the window frame 13. In this manner, even if the distances W1, W2 varies significantly, the elastic force and large flexing amount of the connecting portion 32 causes the intermediate seal lip 31 to contact the window glass 12 so that the interior of the vehicle is sealed from the exterior of the vehicle with the desired sealing pressure.

Referring to FIG. 2, in this embodiment, a spring 33 is embedded in the connecting portion 32 of the second and third extruded portions 22, 23 to urge the intermediate seal lip 31 toward the window glass 12. The spring 33 is embedded in the longitudinal direction of the main body 25 from one end to the other end in the connecting portion 32. Thus, the urging force of the spring 33 is continuously applied from one end to the other end of the connecting portion 32 in each of the extruded portions 22, 23.

Figure 4:
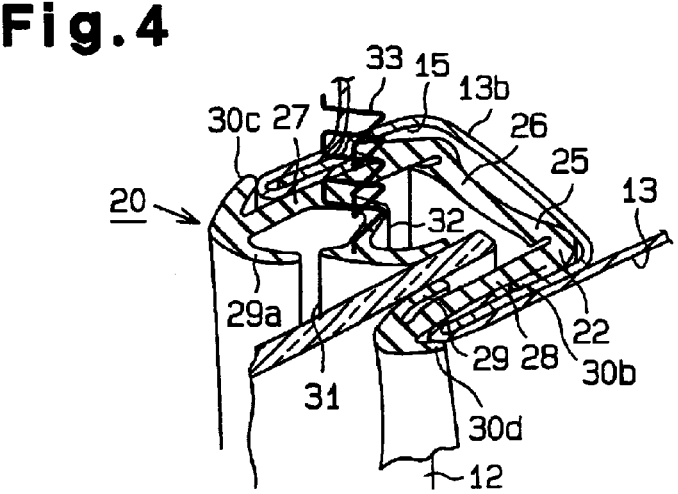
FIG. 4 is a perspective cross-sectional view showing a spring of FIG. 3.
Figure 6:
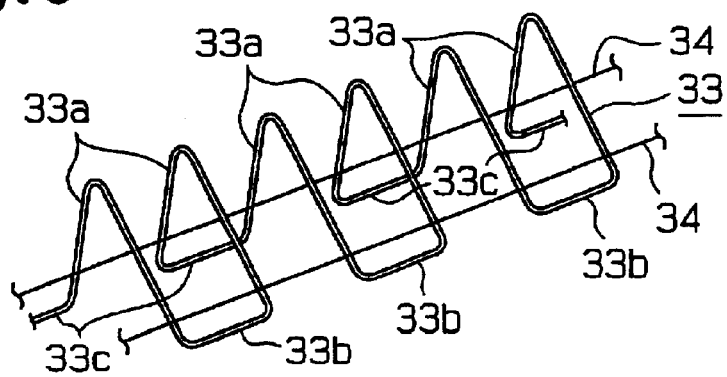
FIG. 6 is a perspective view showing the spring.

As shown in FIGS. 4 and 6, the spring 33 is formed by a single metal wire. The spring 33 is formed so that when the seal lip 29, the cover seal lip 29a, and the intermediate seal lip 31 contact the window glass 12, the spring 33 would have a V-shaped image when projected on a plane that is perpendicular to the longitudinal direction of the main body 25. Further, the spring 33 includes V-shaped portions 33a, which are formed at equal intervals along the longitudinal direction of the main body 25 and which are parallel to a plane that is perpendicular to the longitudinal direction of the main body 25. The spring 33 also includes first end connecting portions 33b, which connect one of the ends of the V-shaped portions 33a, and second end connecting portions 33c, which connect the other ends of the V-shaped portions 33a. The first end connection portions 33b and the second end connecting portions 33c are formed alternately in the longitudinal direction. Further, the V-shaped portions 33a are connected to one another by a pair of straight wires 34.

An example of a procedure for forming the spring 33 will now be discussed.

Figure 7:
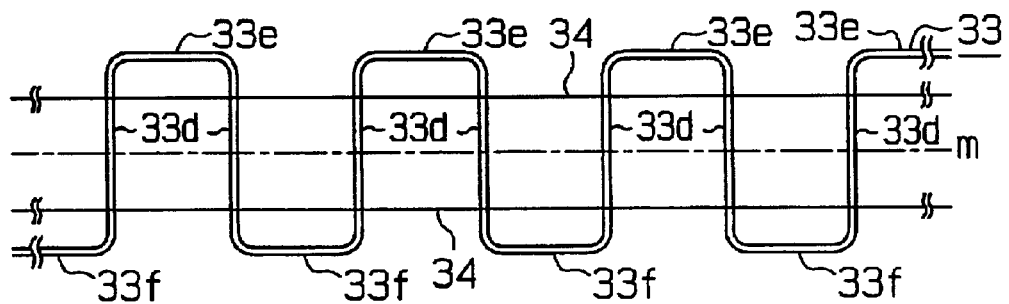
FIG. 7 is a plan view illustrating part of a process for forming the spring.

Referring to FIG. 7, a wire is bent to form lateral portions 33d, which is perpendicular to a center line m, and upper and lower side portions 33e, 33f, which extend continuously from each lateral portion 33d parallel to the center line m. The upper and lower side portions 33e, 33f are formed alternately. Then, non-expansible wires 34 connect the lateral portions 33d in the vicinity of the upper side portions 33e and the lower side portions 33f. Finally, the lateral portions 33d are bent in a V-shaped manner at portions intersecting the center line M. Thus, the spring 33 subtly expands in the direction parallel to the center line M when extrusion is performed.

When extruding the second extruded portions 22, the V-shaped spring 33 is sent to an extruding apparatus together with the material that forms the extruded portions 22. This forms the second extruded portions 22 with the spring 33 embedded in the connecting portions 32.

The seal lips arranged on the front and rear vertical portions of the glass run 20 (second extruded portions 22) in the interior side of the vehicle have a double-step structure, which includes the intermediate seal lip 31 and the cover seal lip 29a that is located closer to a center of the opening 100 than the intermediate seal lip 31. The seal lip 29 arranged on the upper portion of the glass run 20 (first extruded portion 21) in the interior side of the vehicle has a single-step structure. This is because the first extruded portion 21 is used only when the window glass 12 completely closes the opening 100. Thus, even if the seal lip 29 has a single-step structure as shown in FIG. 5, the three-dimensional shape of the window glass 12 hardly affects the sealing capability of the seal lip 29. Accordingly, the sealing between the glass 12 and the seal lip 29 is maintained.

Figure 8:
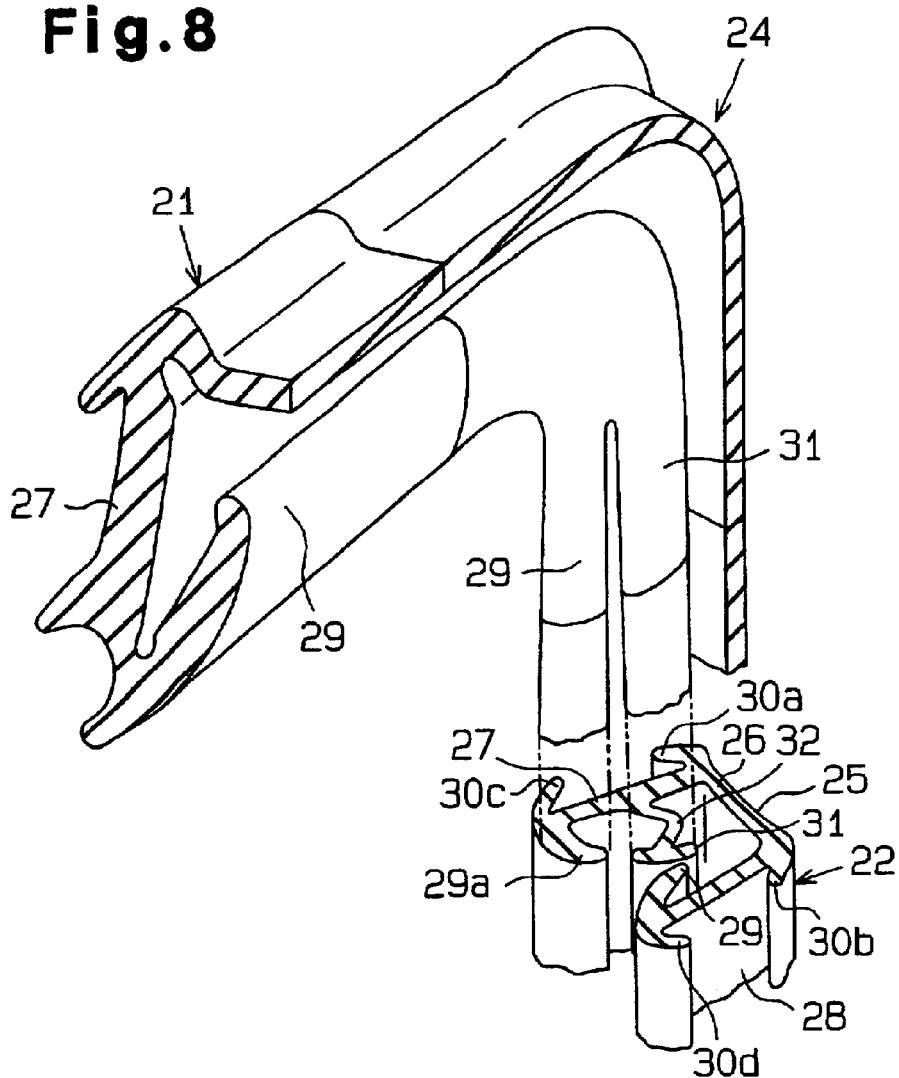
FIG. 8 is a perspective cross-sectional view partially showing a corner of a glass run.
Figure 9:
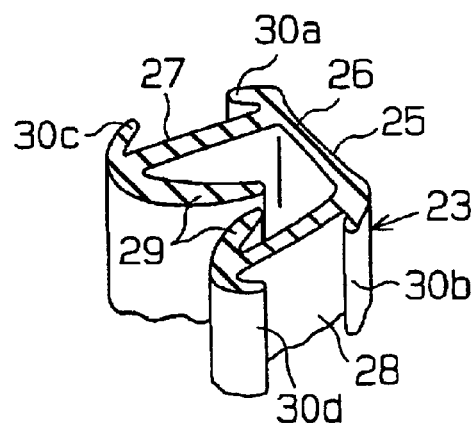
FIG. 9 is a partial perspective view showing a third extruded portion.

Referring to FIG. 8, in the molded portions 24, which are formed at the corners of the glass run 20, at least the intermediate seal lip 31 of each second extruded portion 22 is formed continuously and integrally with the inner seal lip 29 of the first extruded portion 21. Seal lips of the third extruded portions 23 are located below an outer glass weather strip 40 and do not require a high sealing capacity. Thus, the third extruded portions 23 have single-step seal lips 29 as shown in FIG. 9 to reduce the cost of the glass run 20. Although not shown in the drawings, the molded portions 24 connecting the corresponding second and third extruded portions 22, 23 are formed so that the intermediate seal lip 31 of each second extruded portion 22 is formed continuously and integrally with the inner seal lip 29 of the associated third extruded portion 23.

The advantages of the first embodiment will now be described.

(1) In the first embodiment, the second extruded portions 22 of the glass run 20, which serve as a vehicle seal, has a double-step structure, which includes the cover seal lip 29a and the intermediate seal lip 31. Further, the V-shaped connecting portion 32 connects the inner side wall 27 and the intermediate seal lip 31. Thus, the large flexing amount of the intermediate seal lip 31 facilitates the movement of intermediate seal lip 31 without being affected by the cover seal lip 29a. Accordingly, even if the distances W1, W2 between the three-dimensional window glass 12 and the outer side wall 28 or inner side wall 27 varies significantly, the flexing of the connecting portion 32 causes the intermediate seal lip 31 to contact the inner surface of the window glass 12 while applying a predetermined pressure on the glass 12. Thus, the full length of the intermediate seal lip 31 contacts the window glass 12 with the desired sealing pressure. Thus, the glass run 20 maintains the required sealing capability.

(2) In the first embodiment, the cover seal lip 29a covers the V-shaped connecting portion 32. Thus, the glass run 20 has a satisfactory appearance.

(3) In the first embodiment, the seal lips of the first extruded portion 21, which is the upper portion of the glass run 20, and the third extruded portions 23, which are the vertical portions located below the belt line 14, have a single-step structure, while the lip seals of each second extruded portion 22 have a double-step structure. Further, in the front and rear corners connecting the first extruded portion 21 and the second extruded portion 22, the interior side intermediate seal lip 31 of each second extruded portion 22 is continuously and integrally connected with the corresponding interior side seal lip 29 of the first extruded portion 21. Thus, the portions on which the double-step structure of the seal lip 29a and the intermediate seal lip 31 are formed are minimized, and the cost of the entire glass run 20 is kept low.

(4) In the first embodiment, the spring 33 is arranged in the connecting portion 32. Thus, the urging force of the spring 33 forcibly urges the intermediate seal lip 31 toward the inner surface of the window glass 12. This improves the sealing capability.

(5) The first embodiment employs the spring 33, which is formed from a metal wire. This applies an urging force to the connecting portion 32, which force is greater than the rubber elastic force of the connecting portion 32 of the extruded portions 22, 23. Further, since the spring 33 is light, the weight of the glass run 20 increases only slightly.

(6) In the first embodiment, when the spring 33 is projected on a plane that is perpendicular to the longitudinal direction of the main body 25 of the corresponding second extruded portion 22 when the intermediate seal lip 31 is in contact with the window glass 12, the spring 33 would have a V-shaped projected image. Thus, if an external force produced by the vertical movement of the window glass 12 elastically deforms the spring 33 so that the first end connecting portions 33b and the second end connecting portions 33c of the V-shaped portions 33a move toward each other, the resilient force of the spring 33 returns the spring 33 to its original form when the external force is removed. Thus, by using the urging force of the spring 33, the flexing amount of the connecting portion 32 is varied in accordance with changes in the distances W1, W2 when the three-dimensional window glass 12 is vertically moved regardless of whether the distances increases or decreases.

(7) In the first embodiment, the spring 33 is arranged so that the urging force of the spring 33 is continuously applied from one end to the other end of the main body 25 of the corresponding second extruded portion 22. Thus, even when the glass run 20 is arranged along the periphery of the three-dimensional window glass 12, which has portions with forms that change at a relatively large extent, the urging force of the spring 33 facilitates contact between the intermediate seal lip 31 and the window glass 12.

(8) In the first embodiment, the spring 33 is embedded in the connecting portion 32 of each second extruded portion 22. Thus, the glass run 20 is attached to the window frame 13 of the front door 11 in the same manner as in the related art. This also prevents the spring 33 from deteriorating or from falling out of the connecting portion 32.

Modifications of the first embodiment will now be discussed.

The seal lips of the vehicle exterior side and vehicle interior side of the first and third extruded portions 21, 23 of the glass run 20 may have a double-step structure.

The spring 33 may be embedded in the bent portion between the inner side wall 27 and the connecting portion 32 and in the bent portion between the connecting portion 32 and the intermediate seal lip 31. Further, the spring 33 may have a W-like cross-section that traverses the inner side wall 27, the connecting portion 32, and the intermediate seal lip 31. The spring 33 may also be arranged in the bent portion between the inner side wall 27 and the seal lip 29, which extends from the inner side wall 27, or between the bent portion between the outer side wall 28 and the seal lip 29, which extends from the outer side wall 28.

In the first embodiment, in addition to the inner side wall 27, an intermediate seal lip may be provided on the outer side wall 28. In such case, a spring may be embedded in the connecting portion of the intermediate seal lip.

Figure 11:
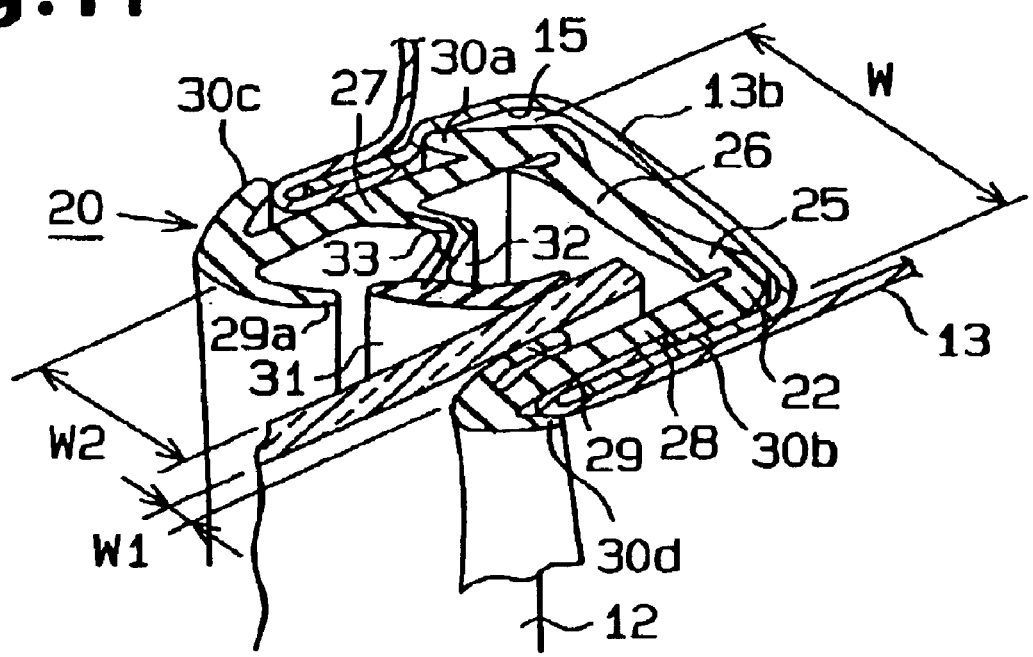
FIG. 11 is a perspective cross-sectional view of a modification of the glass run of the first embodiment.

In the first embodiment, as shown in FIG. 11, the connecting portion 32 may be formed, for example, through extrusion from a material that differs from that of the intermediate seal lip 31, such as a sponge material. In this case, the elastic force of the sponge material is used as an urging means. This modification forms the connecting portion 32, which deforms elastically and requires a large flexing amount, from an optimal material. Further, since the spring 33 does not have to be used, the number of components decreases and manufacturing is facilitated.

A vehicle seal, an outer glass weather strip or an inner glass weather strip that is attached to the belt line, according to a second embodiment of the present invention will now be discussed with reference to FIGS. 1 and 10 centering on parts that differ from the first embodiment.

As shown in FIGS. 4–10, an outer glass weather strip 40 is arranged along a belt line 14 of an outer plate 11a, which serves as an outer panel of the front door 11.

The outer glass weather strip 40 is made of rubber such as ethylene propylene diene terpolymer (EPDM), thermoplastic elastomer such as thermoplastic olefin (TPO), elastomeric synthetic resin such as elastomeric polyvinyl chloride, or a mixture of these substances. The outer glass weather strip 40 is formed through a known extrusion process and cut into a predetermined length.

Figure 10:
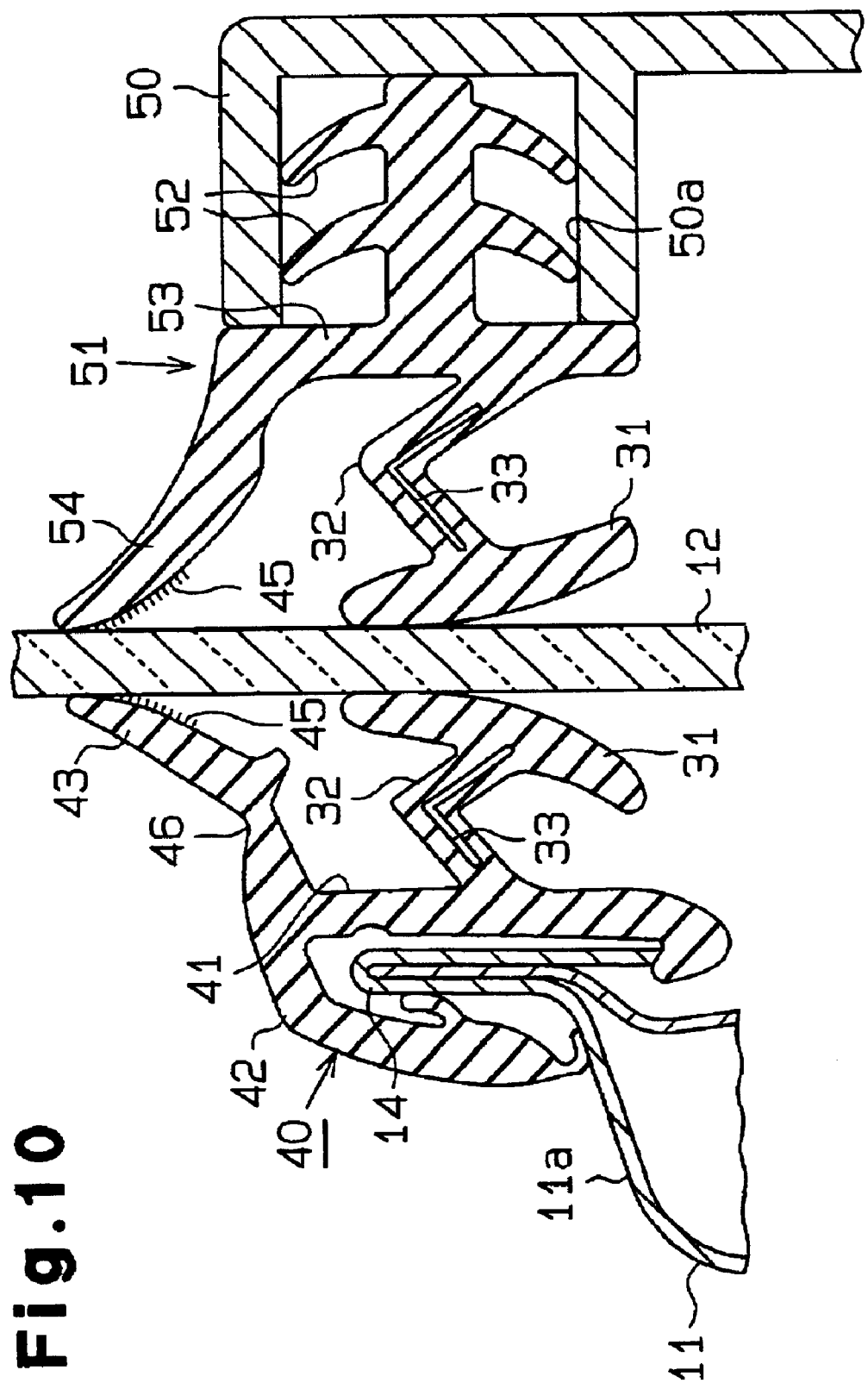
FIG. 10 is a cross-sectional view showing outer and inner glass weather strips according to a second embodiment of the present invention.

Referring to FIG. 10, the outer glass weather strip 40 includes a main body 41, which is held on the belt line 14 and serves as a base, a decorative part 42, and a seal lip (cover seal lip) 43, which contacts the outer surface of the window glass 12. An intermediate seal lip 31, which contacts the outer surface of the window glass 12, and a connecting portion 32 are formed integrally with the main body 41.

The decorative part 42 covers a flange extending from the outer plate 11a of the front door 11. The outer glass weather strip 40 is attached to the belt line 14 so that the flange of the outer plate 11a is held between the main body 41 and the decorative part 42. The seal lip 43, which extends from the window glass 12 side of the main body 41, is located above the intermediate seal lip and spaced from the intermediate seal lip 31 by a predetermined distance.

The seal lip 43 extends diagonally upward from the main body 41. Flock pile 45, which contact and brush the outer surface of the window glass 12, are provided on the distal portion of the seal lip 43. A thin portion 46 is defined on the basal end of the seal lip 43. The thin portion 46 enables the seal lip 43 to bend between a contact position, at which the seal lip 43 contacts the outer surface of the window glass 12, and a separated position, at which the seal lip 43 is separated from the outer surface of the window glass 12.

As shown in FIG. 10, an inner glass weather strip 51 is arranged along the belt line 14 of the front door 11.

The inner glass weather strip 51 is formed from the same material as the outer glass weather strip 40. The inner glass weather strip 51 is also formed through a known extrusion process and cut into a predetermined length.

As shown in FIG. 10, the inner glass weather strip 51 has a main body 53, which serves as a base and has engaging lips 52, and a seal lip (cover seal lip) 54, which contacts the inner surface of the window glass 12. The engaging lips 52 are engaged with an engaging groove 50a formed on a door trim 50, or an inner panel in the front door 11. An intermediate seal lip 31, which contacts the inner surface of the window glass 12, and a connecting portion 32 are formed integrally with the main body 53.

In addition to advantages (1), (2), and (4) to (8) of the first embodiment, the second embodiment has the advantages described below.

(9) In the second embodiment, the outer and inner glass weather strips 40, 51 have double-step seal lip structures that include the intermediate seal lip 31 and the cover seal lips 43, 54, which are located closer to the center of the opening 100. Further, the main bodies 41, 53, which serve as the bases, and the intermediate seal lips 31, are integrally connected to each other by the elastically deformable V-shaped connecting portions 32. Thus, the intermediate seal lips 31 deform in accordance with changes in the distances W1, W2 with respect to the directions indicated by arrows B of FIG. 1.

Modifications of the second embodiment will now be discussed.

The connecting portions 32 may have U-shaped or rectangular cross-sections.

The spring 33 may be embedded in the bent portion between the main bodies 41, 53 and the connecting portion 32 and in the bent portion between the connecting portion 32 and the intermediate seal lip 31. Further, the spring 33 may have a W-like cross-section that traverses the main bodies 41, 53, the connecting portion 32, and the intermediate seal lip 31.

A conventional seal lip may be used in lieu of the intermediate seal lip 31 of the outer glass weather strip 40, and the intermediate seal lip 31 and the connecting portion 32 may be provided only on the inner glass weather strip 51. Alternatively, the intermediate seal lip 31 may be formed only on the outer glass weather strip 40.

Modifications that may be made to both the first and the second embodiments will now be discussed.

The intermediate seal lips 31 may be formed of a solid rubber or resin material, and the connecting portions 32 may be formed of an easily deformable rubber or resin material, such as a sponge.

The spring 33 may be eliminated. In this case, the thickness and material is determined so that the connecting portion 32 has the optimal elastic force.

The spring 33 may be arranged in only part of the main body 25 in the longitudinal direction of the connecting portion 32. Further, a plurality of the springs 33 may be arranged in the connecting portion 32 in the longitudinal direction of the main body 25 so that the urging force of the spring 33 is applied to the connecting portion 32 from one end of the main body 25 to the other end of the main body 25 at predetermined intervals.

The spring 33 may be formed by, for example, connecting a plurality of short wires in a grid-like manner or a ladder-like manner, and bending the connected wires so that the projected image of the wires would have the predetermined shape.

The spring 33 may be formed from, for example, a thin plate. In such a case, the thin plate is stamped into a grid-like manner or a ladder-like manner. The stamped plate is then bent to form the spring 33 so that a projected image of the spring 33 would have the predetermined shape.

The spring 33 may be formed so that its projected image is U-shaped or W-shaped. In the projected image, the spring 33 may have a shape that is similar to the shape of the connecting portion. It is only required that the spring 33 be formed so that the spring 33 is elastically deformable and the ends of the spring 33 are urged toward each other.

The spring 33 may be formed from a material differing from that of the connecting portion 32, such as plastic.

The above embodiments are examples of seals arranged about the periphery of the three-dimensional window glass 12. However, the present invention may also be applied to seals arranged about the periphery of a conventional window glass, such as a flat glass or a glass that is slightly curved in the vertical and horizontal directions.

The present invention may be applied to vehicle seals such as glass runs and outer glass weather strips attached to rear doors.

The present invention may be applied to vehicles having two side doors (so-called two-door and three-door vehicles). The present invention may also be applied to vehicles having a pair of front doors and a single rear door and to vehicles having a pair of front doors and a sliding door, which slides along the side of the vehicle. A vehicle seal according to the present invention may also be applied in a vehicle having a pair of front doors, a rear door, and a slide door to at least one of a glass run and a weather strip attached to the front door, the side door, or the rear door. Further, a vehicle seal according to the present invention may also be applied to a vehicle having a back door with a vertically movable window glass.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A vehicle seal attached to a frame defining a window glass opening of a vehicle to support a peripheral portion of a vertically movable window glass, the vehicle seal comprising:

a main body arranged along the frame;

a plurality of seal lips formed integrally with the main body to contact a surface of the window glass, wherein the plurality of seal lips include an intermediate seal lip and a cover seal lip, wherein the intermediate seal lip and the cover seal lip contact the same surface of the window glass, and wherein the cover seal lip is located closer to a center of the opening than the intermediate seal lip; and an elastically deformable connecting portion for connecting the main body and the intermediate seal lip, the connecting portion having a V-shaped or U-shaped cross-section defining a V-shaped or U-shaped gap therein, wherein the connecting portion is elastically deformable so that the intermediate seal lip is movable toward and away from the main body, and wherein when the window glass contacts the intermediate seal lip, the connecting portion is elastically deformed to narrow the gap.

2. The vehicle seal according to claim 1, wherein the connecting portion and the intermediate seal lip are made of different materials, and the material of the connecting portion has an elastic force that urges the intermediate seal lip toward the surface of the window glass.

3. The vehicle seal according to claim 1, wherein the connecting portion includes a spring that urges the intermediate seal lip toward the surface of the window glass.

4. The vehicle seal according to claim 3, wherein in an image that the spring would have when projected on a plane perpendicular to a longitudinal direction of the main body, two ends of the spring move toward and away from each other.

5. The vehicle seal according to claim 4, wherein, in the image, the spring has a shape that is similar to the shape of the connecting portion.

6. The vehicle seal according to claim 3, wherein the spring is formed so that an urging force is continuously applied from a first end to a second end of the main body.

7. The vehicle seal according to claim 3, wherein the spring is formed from a wire.

8. The vehicle seal according to claim 1, wherein the vehicle seal is a glass run including a vertical portion arranged along a vertical side of the opening;

wherein the vertical portion includes the main body, which has a U-shaped cross-section, and the main body has an inner side wall, which is located on an interior side of the vehicle, and an outer side wall, which is located on the exterior side of the vehicle;

wherein the plurality of seal lips include an inner seal lip, which is formed on the inner side wall and which contacts an inner surface of the window glass, and an outer seal lip, which is formed on the outer side wall and which contacts an outer surface of the window glass, and wherein at least the inner seal lip includes the intermediate seal lip and the cover seal lip; and wherein the connecting portion connects the inner side wall and the intermediate seal lip.

9. The vehicle seal according to claim 8, wherein the glass run includes an upper portion, which is arranged along an upper side of the opening, and a molded portion for connecting the vertical portion and the upper portion;

wherein the upper portion of the glass run includes a single seal lip, which is formed on the inner side wall and contacts the inner surface of the window glass; and wherein the molded portion integrally connects at least the intermediate seal lip of the vertical portion and the single seal lip of the upper portion.

10. The vehicle seal according to claim 8, wherein the cover seal lip is formed to cover the connecting portion so as to prevent the connecting portion from being visible from the interior of the vehicle even when a gap is formed between the cover seal lip and the intermediate seal lip.

11. The vehicle seal according to claim 8, wherein the connecting portion includes a spring that urges the intermediate seal lip toward the surface of the window glass.

12. A vehicle seal attached to a window frame defining an opening in a vehicle to support a peripheral portion of a vertically movable window glass, the vehicle seal comprising:

a main body arranged along the window frame;

an inner seal lip formed on the main body to contact an inner surface of the window glass;

an outer seal lip formed on the main body to contact an outer surface of the window glass;

an intermediate seal lip located farther from a center of the opening than the inner seal lip, wherein the intermediate seal lip contacts the inner surface of the window glass; and an elastically deformable connecting portion for connecting the main body and the intermediate seal lip, the connecting portion having a V-shaped or U-shaped cross-section defining a V-shaped or U-shaped gap therein, wherein the connecting portion is elastically deformable so that the intermediate seal lip is movable toward and away from the main body, and wherein when the window glass contacts the intermediate seal lip, the connecting portion is elastically deformed to narrow the gap.

13. A glass run attached to a window frame defining an opening in a vehicle to support a peripheral portion of a vertically movable window glass, the glass run comprising:

a vertical portion attached to a vertical side of the window frame; and an upper portion attached to an upper side of the window frame, wherein the vertical portion includes:

a first main body having a U-shaped cross-section and arranged along the window frame, the first main body having a first inner side wall, which is located on an interior side of the vehicle, and a first outer side wall, which is located on an exterior side of the vehicle;

a first inner seal lip formed on the first inner side wall to contact an inner surface of the window glass;

a first outer seal lip formed on the first outer side wall to contact an outer surface of the window glass;

an intermediate seal lip located farther from a center of the opening than the first inner seal lip, wherein the intermediate seal lip contacts the inner surface of the window glass; and an elastically deformable connecting portion for connecting the first main body and the intermediate seal lip, wherein the connecting portion has a V-shaped or U-shaped cross-section and is elastically deformable so that the intermediate seal lip is movable relatively toward and away from the first main body; and wherein the upper portion includes:

a second main body having a U-shaped cross-section and arranged along the window frame, the second main body having a second inner side wall, which is located on the interior side of the vehicle, and a second outer side wall, which is located on the exterior side of the vehicle;

a second inner seal lip formed on the second inner side wall to contact the inner surface of the window glass; and a second outer seal lip formed on the second outer side wall to contact the outer surface of the window glass.

* * * * *